Aug. 9, 1960 R. A. GULICK 2,948,033
METHOD OF FORMING HUB ASSEMBLY
Filed May 31, 1957 2 Sheets-Sheet 1

Ronald A. Gulick
INVENTOR.

BY
ATTORNEY

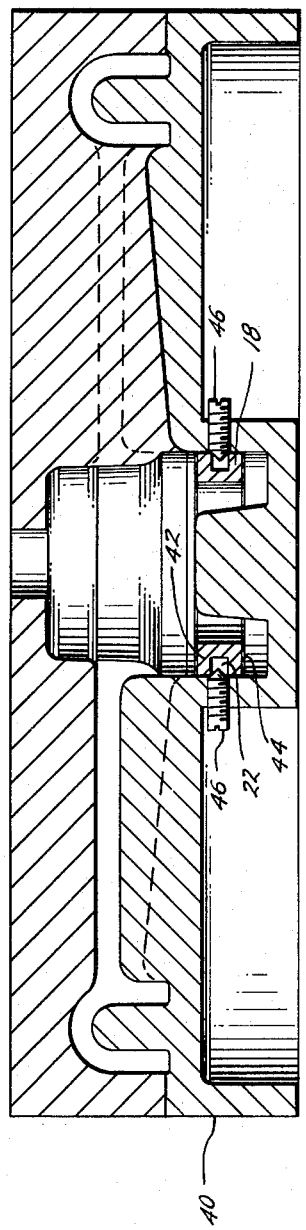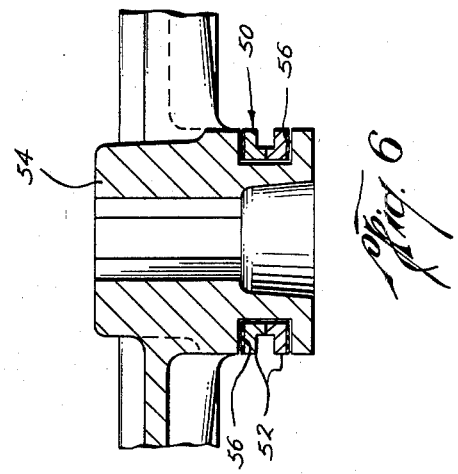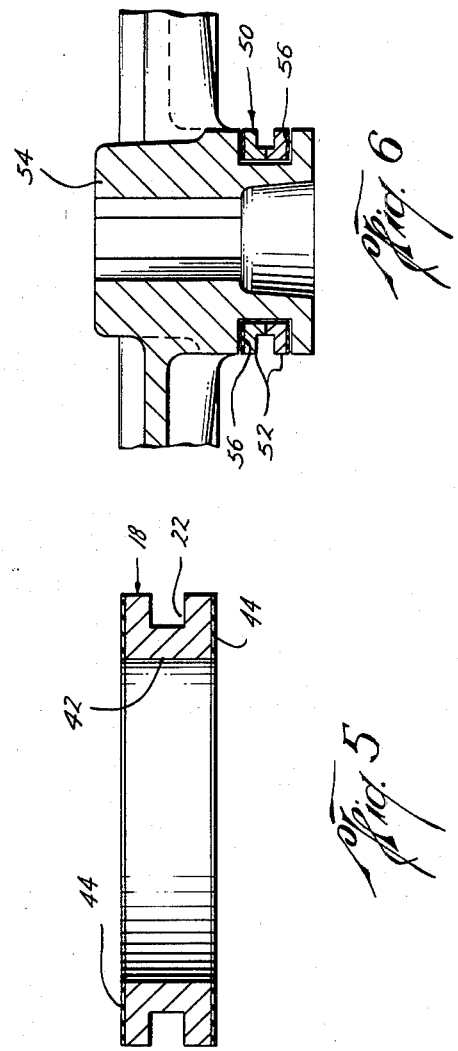

United States Patent Office 2,948,033
Patented Aug. 9, 1960

2,948,033

METHOD OF FORMING HUB ASSEMBLY

Ronald A. Gulick, Bellaire, Tex., assignor to ACF Industries, Incorporated, New York, N.Y., a corporation of New Jersey Filed May 31, 1957, Ser. No. 662,729

4 Claims. (Cl. 22—202)

This invention relates to an article having an integral rotatable bearing member and to the method of forming said article.

Certain articles, such as handwheels for valves and allied units, require subassemblies to carry the high thrust loads while operating at reasonably low torques. These subassemblies require numerous parts which aggravate inventory problems and lead to an excessive amount of separate unit handling. In order to cut down on inventory problems and separate handling operations, it would be desirable to have the aforementioned subassemblies, i.e. rotatable thrust bearing assembly integral, thereby producing a unitary item. However, such articles are commonly formed by sand or die casting, and if a thrust bearing assembly is interposed in a mold or die, the casting material forming the assembly will flow around such member and immobilize it.

The assembly of the present invention incorporates an integral rotatable bearing member. In order to obtain the greatest advantage of the novel assembly, it was necessary to develop a novel method to form such assembly. It was discovered that by utilizing a thrust bearing having a load carrying member sandwiched between relatively thin sheets of polytetrafluoroethylene it is possible to cast the novel assembly with an integral bearing assembly. Polytetrafluoroethylene will not adhere to casting material and even though polytetrafluoroethylene will start to decompose at 500° F. and will melt at 620° F., it has been discovered that polytetrafluoroethylene has certain high temperature endurance characteristics which enable it to be subjected to die casting temperatures far above its melting point for short periods of time. It has also been discovered that polytetrafluoroethylene has the hot flow characteristics such that upon shrinkage of the surrounding casting material, the plastic will not flow thereby relieving the loads produced by casting shrinkage to a degree that rotation of the thrust bearing is allowed. By utilizing the thin layer of the plastic material bonded to a load carrying member, the load carrying characteristic is markedly improved, and the material will carry relatively high loads without cold flowing.

The principal object of the present invention is to provide a method of casting an assembly incorporating an integral rotatable section.

An important object is to provide a hub assembly having an integrally formed thrust bearing.

Another important object is to provide a means of casting an article having an integral rotatable load carrying member.

A further important object is to provide an assembly having a rotatable thrust bearing capable of facile attachment to a cylindrical bore.

A more specific object is to provide a handwheel having an integral rotatable bearing member capable of facile attachment to a valve bonnet.

Other and further objects of the invention will be obvious upon an understanding of the illustrative embodiment about to be described or will be indicated in appended claims and various advantages not referred to herein will occur to one skilled in the art upon employment of the invention in practice.

A preferred embodiment of the invention has been chosen for the purposes of illustration and description and is shown in the accompanying drawings forming a part of this specification wherein:

Fig. 4 is a diagrammatic section view through the cavity of a mold.

Fig. 5 is a vertical cross-section of the bearing.

Fig. 6 is a vertical section view showing a modified form of thrust bearing.

Figure 1:
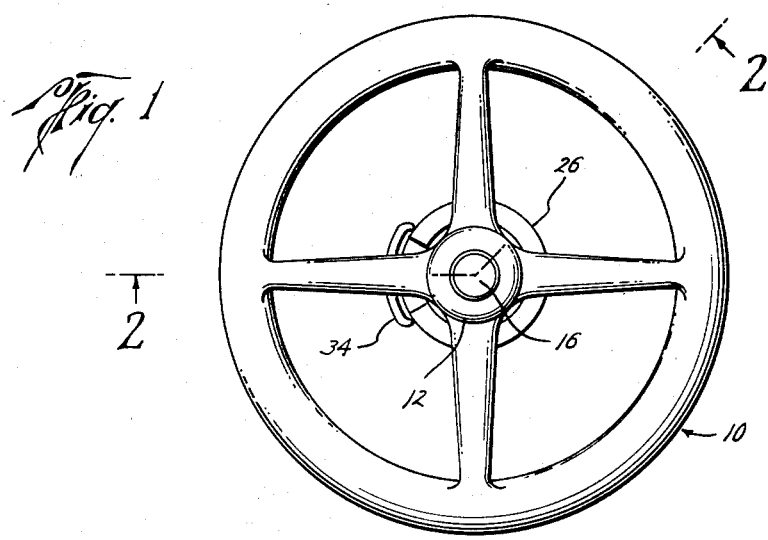
Fig. 1 is a top plan view of a handwheel formed in accordance with the present invention.
Figure 2:
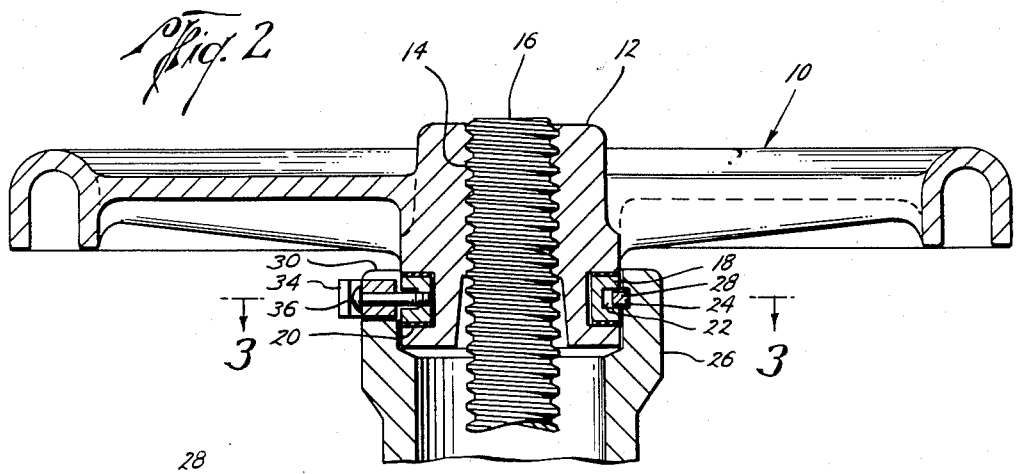
Fig. 2 is a section view taken generally along lines 2—2 of Fig. 1.
Figure 3:
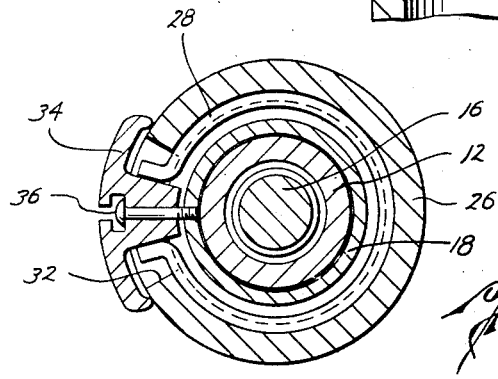
Fig. 3 is a section view taken generally along lines 3—3 of Fig. 2.

Ordinarily in valves, a separate and independent thrust bearing is utilized about the stem to absorb opening and closing torques while permitting easy turning of the handwheel. Having separate bearings necessitates the separate stocking and inventorying of stem nuts, bearings, bearing retention means, handwheels and handwheel retention means. Numerous separate and distinct assembly operations are required.

The handwheel 10 of the present invention is a unitary structure capable of being attached to a valve in an easy manner. There is a central hub portion 12 provided with a threaded passage 14 adapted to threadingly engage a threaded stem 16 of the valve (not shown). A thrust bearing 18 is an integral part of the hub assembly 12 and is disposed in a circumferential groove 20 surrounding the hub 12. The thrust bearing is provided with a circumferential groove 22. By having a mating groove 24 in the valve bonnet 26, the handwheel 10 can be secured to the valve bonnet 26 by means of a spring retainer ring 28.

To attach the handwheel 10 to the valve, the handwheel 10 is threadingly engaged with the stem 16 and screwed down until the groove 22 is just above the top 30 of the bonnet 26. The ring 28, which reposes in the groove 22, is squeezed into the groove 22. Turning of the handwheel is continued and the ring 28 moves downward in the cut out portion 32 of the bonnet. As the ring 28 passes the groove 24, it snaps into place, thereby lockingly retaining the handwheel in position. If desired, a block 34 may be placed in portion 32 and a screw 36 used to retain it in position. After the handwheel is locked in position, any turning of the handwheel will transmit motion to the threaded stem 16 operating the valve. To detach the handwheel 10, the block 34 is removed, the ring 28 squeezed together and the handwheel rotated opposite to assembly until the ring 38 is past the groove 24. The ring 28 will remain contracted until it passes the top 30 of the bonnet 26. Continued rotation of the handwheel will disengage it from threaded engagement with the stem 16. In light valves after the ring 28 is compressed, the handwheel can be directly pulled up so that the ring clears the top 30 of the bonnet 26 and the handwheel 10 then rotated to disengage it from threaded engagement with the stem 16.

While the handwheel 10 just described is for a rising stem valve, the integral thrust bearing 18 can be similarly utilized on the hub portion of a handwheel for a non-rising stem valve. Also, the bearing 18 can be incorporated in an assembly adapted for receiving a unit for remote operation.

While the bearing 18 can be incorporated into the hub 12 of the handwheel 10 by necking the lower part of the hub, threading such portion and then threadingly engaging and locking a threaded ring to form the groove 20, it was felt that if the handwheel could be formed as a unitary cast assembly, the cost of the handwheel would be substantially reduced. However, if an ordinary thrust bearing is place in the mold prior to casting, the casting material will flow around such bearing and immobilize it.

It was found that polytetrafluoroethylene could be used as a mold relief inasmuch as it will not adhere to the casting material while the casting material is in a liquid or solid state or any interim transition.

It was discovered that while polytetrafluoroethylene will start to decompose at about 500° F. and will melt at 620° F., the material has certain high temperature endurance characteristics if maintained at the temperatures outlined in the following chart:

| Temperature Range | Permissible Exposure (Seconds) [1] | Decomposition (Seconds) [2] |
|---|---|---|
| 788–935° F | 60 | 120 |
| 1203–1280° F | 15 | 20 |
| 1380–1560° F | 5 | 10 |

[1] Material still continuous, unbroken and capable of being flexed.
[2] Material broken, split, or opened up.

Since the injection temperature of materials such as zinc and aluminum alloys are approximately 800° F. and 1300° F. respectively and cool to 500° F. in less than one second and three seconds respectively, it was decided to cast the handwheel 10 with an integral bearing 18.

It was discovered that the bearing 18, similar to that disclosed in C. E. Anderson's copending application S.N. 633,164, could be placed in the die 40 prior to injection (see Fig. 4). The bearing 18 is formed of a load carrying core 42 to which is bonded relatively thin layers 44—44 of polytetrafluoroethylene. After the bearing has been anchored in die by means, such as set screws 46—46 or other suitable retaining means, the casting material is injected into the die 40. The temperature of the casting material does not maintain a temperature above 500° F. for a time longer than the high temperature endurance characteristic of the polytetrafluoroethylene and, therefore, the polytetrafluoroethylene is not adversely affected. As the casting material cools and shrinks, it exerts a pressure on the layers 44—44, causing the polytetrafluoroethylene to flow out slightly, thereby relieving the loads produced by casting shrinkage to a degree that rotation of the bearing 18 is allowed. It is not necessary to have a layer of polytetrafluoroethylene in the bore of bearing 18 inasmuch as the casting material within this bore shrinks away from said bore, thereby producing radial clearance.

While free (unbonded) virgin polytetrafluoroethylene has a 1% compressive deformation at 600 p.s.i. at 73° F., it was found that by utilizing relatively thin layers of polytetrafluoroethylene and bonding them to a load carrying member, the cold flow characteristics of the plastic material is markedly increased. For example, tests have shown that a .010" sheet of bonded polytetrafluoroethylene will withstand bearing pressures in excess of 4000 p.s.i. at operating temperature of 250° F. Since polytetrafluoroethylene has an extremely low coefficient of friction, the ease of operation of the valve is markedly increased.

By utilizing the bearing 18, the fit between the bearing and corresponding walls of the groove surrounding it will be by nature very snug. If it is desired to obtain a loose fit, a bearing 50 constructed similar to that shown in Fig. 6 can be used. In such form, the load carrying member 52 is split in two parts. In casting a hub assembly 54 incorporating the bearing 50, the two portions 52—52 are kept separate. When the separating means are removed, there will be a space between the walls 56—56 of the groove and the bearing 50.

While the above discusses a novel method of forming a handwheel having an integral rotatable thrust bearing, the method can be utilized to form any assembly incorporating an integral load carrying rotatable member. This load can be either thrust, radial or any combination solely dependent upon the shape of the reinforced polytetrafluoroethylene insert. In other words, any shape of rotatable member can be integrally incorporated in an assembly by having all surfaces subject to load producing casting shrinkage covered by a coating of polytetrafluoroethylene.

As various changes may be made in the form, construction and arrangements of the parts herein without departing from the spirit and scope of the invention and without sacrificing any of its advantages, it is to be understood that all matter herein is to be interpreted as illustrative and not in a limiting sense.

Having thus described my invention in some detail, what I claim is:

1. The process of forming an assembly provided with an integral, rotatable, annular bearing member, said process comprising: utilizing a bearing member formed of two sections, each section having a ring of load carrying material having a thin layer of polytetrafluoroethylene bonded to one side, the unbonded sides of the bearing being face-to-face, positioning the bearing in the cavity of the die with the unbonded faces spaced apart, introducing the assembly material into the die, the assembly material being such that its temperature does not exceed the high temperature endurance characteristics of the polytetrafluoroethylene.

2. The method of forming a metal handwheel for a valve which has an integral, rotatable, annular thrust bearing about the hub, said method comprising: utilizing a thrust bearing formed of a load carrying material having a very thin sheet of polytetrafluoroethylene bonded to each side, positioning the bearing member in the cavity of the die, introducing the metal for the handwheel into the die, the metal being such that its casting temperature does not exceed the high temperature endurance characteristics of the polytetrafluoroethylene.

3. The method set forth in claim 2 wherein the metal is zinc.

4. The method set forth in claim 2 wherein the metal is an aluminum alloy.

References Cited in the file of this patent

UNITED STATES PATENTS

| | | |
|---|---|---|
| 2,196,505 | Morton | Apr. 9, 1940 |
| 2,391,898 | Hobbs | Jan. 1, 1946 |
| 2,555,754 | Morin | June 5, 1951 |
| 2,577,350 | Morin | Dec. 4, 1951 |
| 2,689,380 | Tait | Sept. 21, 1954 |
| 2,797,482 | Zahn | July 2, 1957 |
| 2,829,411 | D'Angelo | Apr. 8, 1958 |